United States Patent [19]

McClure

[11] Patent Number: 4,893,208

[45] Date of Patent: Jan. 9, 1990

[54] MAGNETIC ERASE HEAD WITH TERMINATOR MAGNETS ON THE ENDS

[75] Inventor: Richard J. McClure, San Diego, Calif.

[73] Assignee: Eastman Kodak Company, Rochester, N.Y.

[21] Appl. No.: 191,950

[22] Filed: May 9, 1988

[51] Int. Cl.$^4$ .............................................. G11B 5/325
[52] U.S. Cl. ..................................... 360/118; 360/110
[58] Field of Search ................................. 360/118, 110

[56] References Cited

U.S. PATENT DOCUMENTS

| 3,772,471 | 11/1973 | Imai et al. | 360/118 |
| 4,613,919 | 9/1986 | Miyatake et al. | 360/118 |
| 4,706,145 | 11/1987 | Hirabayashi et al. | 360/118 |

FOREIGN PATENT DOCUMENTS

| 0055412 | 2/1979 | Japan | 360/118 |
| 0150105 | 9/1982 | Japan | 360/118 |
| 0198503 | 12/1982 | Japan | 360/118 |
| 0151332 | 8/1984 | Japan | 360/118 |

Primary Examiner—Stuart N. Hecker
Assistant Examiner—David J. Severin
Attorney, Agent, or Firm—Robert F. Cody

[57] ABSTRACT

An improved form of magnetic erase head is provided which utilizes, in a magnetic erase head, leading and trailing "terminators", which suppress stray fields emanating from leading and trailing magnets.

5 Claims, 3 Drawing Sheets 4,893,208

MAGNETIC ERASE HEAD WITH TERMINATOR MAGNETS ON THE ENDS

BACKGROUND OF THE INVENTION

1. Field of the Invention

This invention relates in general to magnetic heads and more particularly to a magnetic erase head having improved performance.

The prior art, as well as the invention, will be described with reference to the figures, of which FIG. 1 is a diagram illustrating a prior art head over which the invention provides improvement, FIGS. 2–4 are diagrams useful in illustrating a problem addressed by means of the invention, FIG. 5 is a diagram useful in illustrating the principal features of the invention, and FIG. 6 is a diagram illustrating a presently preferred way to implement a magnetic erase head according to the invention.

2. Description Relative to the Prior Art

The fundamental (known) practice in the erasure of recorded information from a magnetic recording medium is to subject the recorded information progressively to an alternating field of gradually diminishing strength. Finn Jorgensen, in his book "The Complete Handbook of Magnetic Recording", Tab Books Inc., Blue Ridge Summit, Pa., 17214, pg. 149, FIG. 7-42, depicts such a practice: In particular, Jorgensen depicts the use of (an odd number of) alternating magnets, at gradually decreasing distance from a medium to be erased; in such depiction, the indicated magnets are oriented so that their "exiting" fields are generally parallel to the medium surface that is to be erased. Such a practice is akin to what has been depicted in FIG. 1 hereof.

U.S. Pat. No. 4,613,919, Magnetic Erasing Head, similarly shows (FIG. 4 thereof) an array of an odd number of erasing magnets with alternating polarities, albeit that the magnets thereof are "not" at a gradually decreasing distance from the medium whose surface is to be erased, but which magnets are oriented so that their "exiting" fields are perpendicular, or somewhat perpendicular, to the medium surface to be erased. Blending the teaching of Jorgensen with the teaching of U.S. Pat. No. 4,613,919 would be productive of a showing as appears in FIG. 2 hereof: Whether the showing of FIG. 4 of U.S. Pat. No. 4,613,919 was an accidental showing of an "odd" number of erasing magnets, the fact is that FIG. 4 is labelled "Prior Art" in U.S. Pat. No. 4,613,919; and the teaching of U.S. Pat. No. 4,613,919 is, as stated therein, for an improvement over the structure of FIG. 4 thereof. In discussing the state of the art—and notwithstanding its showing in FIG. 4 thereof—U.S. Pat. No. 4,613,919 elaborates on the happenstance of "dc residual magnetization" (Col. 2, lines 57-62), and the attendant harmonic distortion resulting therefrom, when using the erase head depicted in FIG. 4 of U.S. Pat. No. 4,613,919. As will appear below, the use of a perhaps-accidental-showing-of-an odd number of arrayed magnets, with alternating exiting fields, is precisely what is needed to preclude the existence of "dc residual magnetization". And, because U.S. Pat. No. 4,613,919 addresses a problem which is obviated by what it, itself, describes as prior art, the question obtains as to whether the showing in FIG. 4 of U.S. Pat. No. 4,613,919 was really intended . . . or accidental. Thus, FIG. 2 hereof depicts the orientations of the trailing magnets in an erase head as "open for discussion", i.e. with question marks.

If the orientation of the trailing magnets of an erase head having an array of magnets of alternating polarities are as depicted in FIG. 3 hereof (which will occur if an even number of arrayed magnets are employed), the aforementioned problem of "dc residual magnetization" will obtain: i.e., although alternating fields $H_{ac}$ effect ac erasing of the recorded medium, because the last of the arrayed magnets has a polarity which is opposite the polarity orientation of the first magnet, undesired coupling between such magnets occurs via a field $H_{dc}$ . . . and it is just field which is the primary cause of undesired "dc residual magnetization" of the recording medium. (As will be appreciated, for sake of a graphic showing, the depicted depth into the recording medium to which the field of a magnet extends is in correspondence with the field strength applied to the medium by that magnet.) By using (see FIG. 4 hereof) an odd number of arrayed magnets in an erasing head, however, whereby the first and last of the arrayed magnets are similarly polarized, the production of a field $H_{dc}$, causing a dc residual magnetization in the recording medium, becomes impossible. In a magnetic erase head according to the invention, the alternately polarized magnets are only 0.010" in thickness.

Now, given the desired use of an odd number of erasing magnets in an array thereof, as taught above, the question obtains as to whether there is anything else that might be done to enhance the erasing function.

SUMMARY OF THE INVENTION

Providing a magnetic erase head with leading and trailing "terminators", which suppress stray fields emanating from leading and trailing magnets, an improved form of magnetic erase head is provided. Terminators, as employed herein, may take a variety of forms:

DETAILED DESCRIPTION OF THE INVENTION

Figure 1:
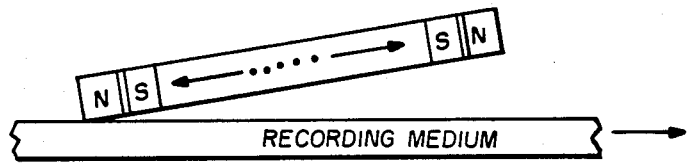
Figure 2:
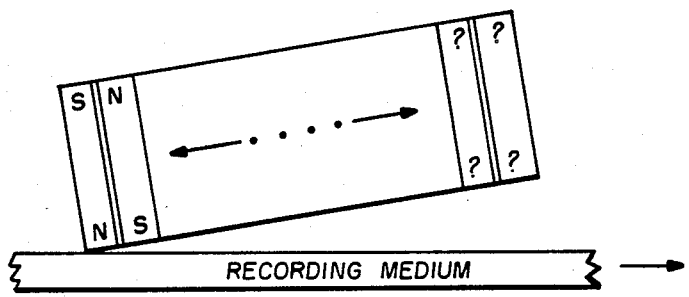
Figure 3:
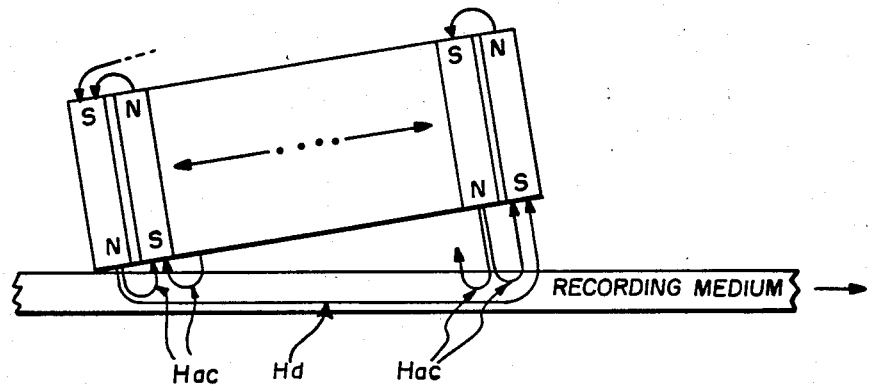
Figure 4:
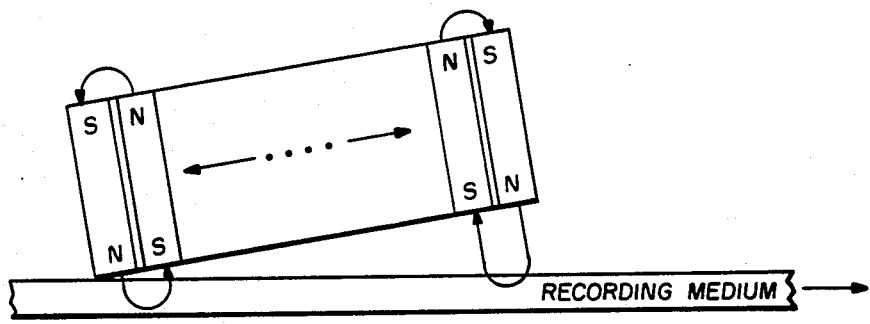
Figure 5:
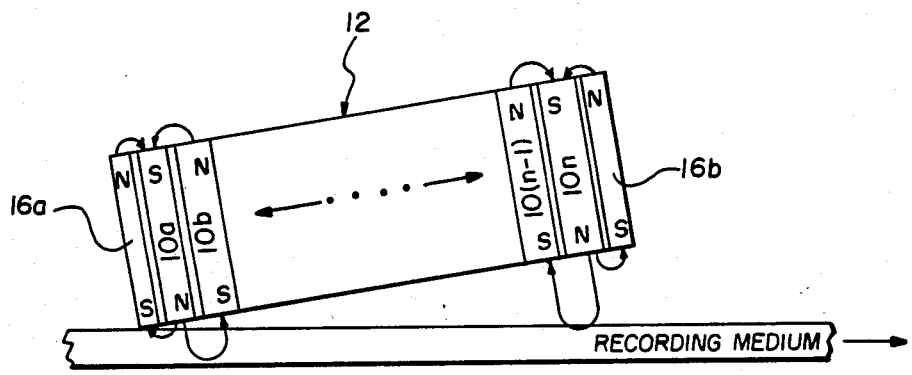

Referring to FIG. 5, an odd number of alternately polarized magnets 10a, b . . . n of a magnetic erase head 12 are arrayed at progressively greater distance from a recording medium. Magnetic terminators 16a and 16b sandwich the erase head 12 therebetween. In one embodiment of the invention, the terminators are thinner magnets than the erase magnets—preferably half-thickness as compared to the thickness of the erase magnets—which are oriented oppositely to their respective adjacent magnets—thereby preserving the preclusion of a longitudinal dc field, such as $H_{dc}$ of FIG. 3. That is, by use of a pair of terminators in the form of permanent magnets, oriented as indicated, the odd-number-of-magnets characteristic is preserved . . . which, in FIG. 5, means that south poles of both terminators are in proximity to the recording medium to be erased . . . and a dc field, such as $H_{dc}$, is precluded. The use of permanent magnets for terminators is preferred because the fields associated with permanent magnets are relatively easy to reconcile for various specified purposes.

An alternative to the use of permanent magnet terminators is to deposit magnetizable material such as permalloy on the face ends of the magnets 10a, 10n. Such material immediately magnetizes to provide the polarities indicated for terminators 16a, 16b. Such being the case, the permalloy works like the permanent magnet terminators, again to minimize the influence of similarly polarized leading and trailing magnets (10a, 10n).

Figure 6:
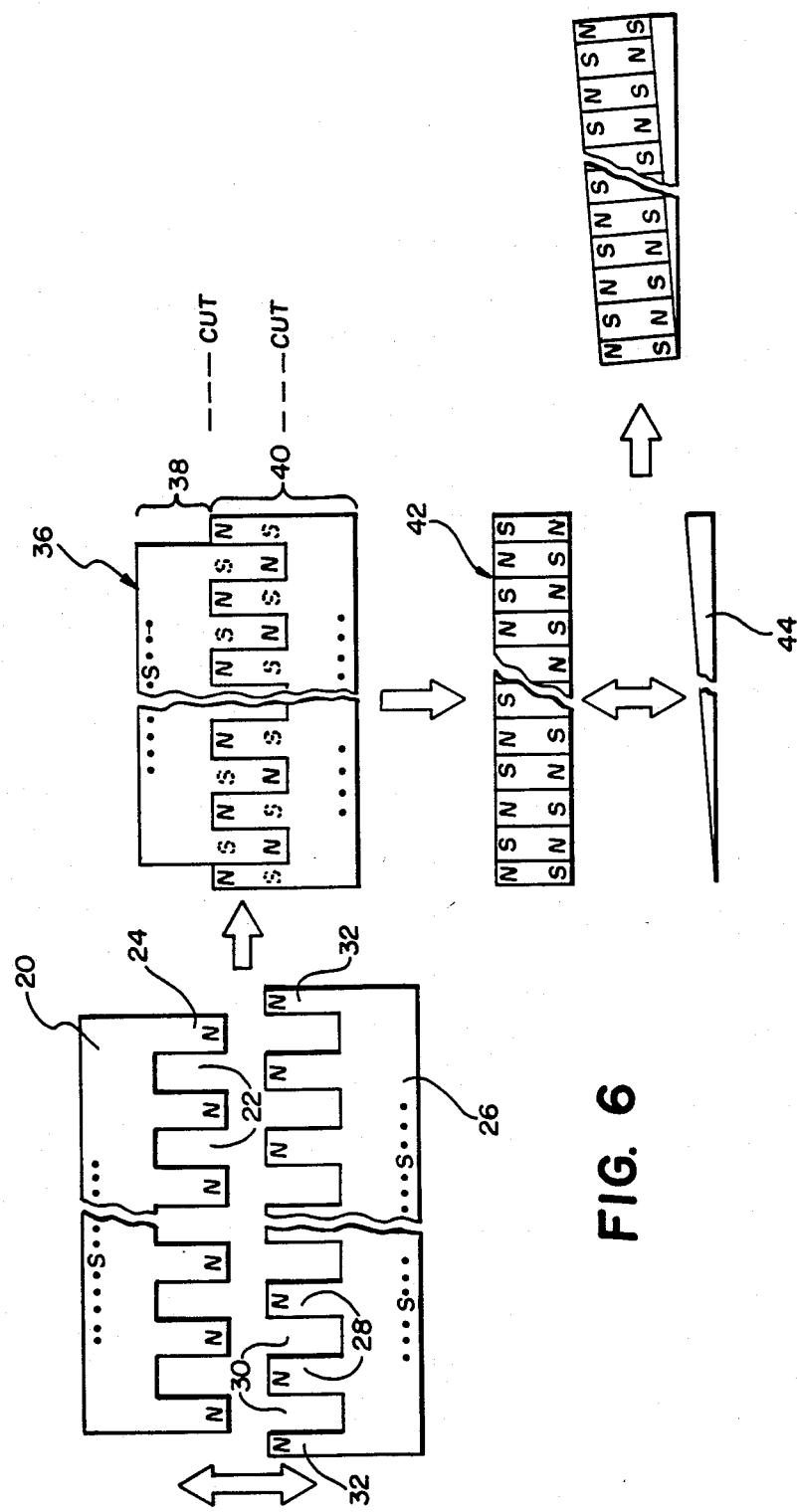

With the above as background, reference should now be had to FIG. 6 for a presently preferred way to construct a magnetic erase head according to the invention: A first permanent magnet 20 is provided with equisized slots 22, one end of each slot-defining member 24 being polarized, for example, northerly in relation to the other end thereof. A second permanent magnet 26, longer than the first permanent magnet 20 by the length of a slot-defining member 28 (approximately equal in thickness to a slot-defining member 24), is also provided with equisized slots 30. By appropriately centering the slots 30, half-thickness end members 32 are provided. The end of each slot defining member (28 or 32) is polarized, for example, northerly in relation to the other end thereof. By enmeshing, and bonding together, the members 20, 26, as shown at 36 . . . and by cutting away waste portions 38, 40 . . . an assembly as shown at 42 is provided. It is then a simple procedure to bond a wedge 44 to the assembly shown at 42 to produce an erase head having not only an odd number of erasing magnets of increasing distance from an erase plane, but a head having half-thickness permanent magnet terminators sandwiching the erase magnets.

The invention has been described in detail with particular reference to a presently preferred embodiment, but it will be understood that variations and modifications can be effected within the spirit and scope of the invention.

What is claimed is:

1. In a magnetic erase head of the type having an array of an odd number of alternatingly polarized permanent erasing magnets of substantially equal thickness so disposed in the array thereof that their respective exiting fields are aimed generally at a recording medium that is to be erased, the improvement wherein the first and last magnets of the array are provided with terminator means for suppressing some of the respective fields which exit said first and last permanent magnets, said terminator means also being permanent magnets sandwiching therebetween said array of erasing magnets, said terminator means permanent magnets being about half as thick as the thickness of said permanent erasing magnets, said half-thickness permanent magnets being similarly polarized with respect to each other, and each being polarized oppositely with respect to its adjacent erasing magnet.

2. The magnetic erase head of claim 1 further comprising means for arraying said permanent erasing magnets at progressively greater distance form said recording medium.

3. A magnetic erasing head comprising
   a. an array of an odd number of alternatingly polarized permanent magnets so disposed that the exiting fields of said permanent magnets aim in the general direction of a medium that is to be magnetically erased, and
   b. first and second terminator means sandwiching said array therebetween for suppressing respective portions of the fields associated with the leading and trailing magnets in said array thereof, at least one said terminator means being a permanent magnet that is thinner than the permanent magnet to which it is adjacent, and oppositely polarized with respect thereto.

4. The magnetic erasing head of claim 3 wherein both terminator means are thinner than the permanent magnets to which they are respectively adjacent, and oppositely polarized with respect thereto.

5. The magnetic erasing head of claim 3 wherein said erasing magnets in said array thereof are of equal thickness and wherein said terminator means are both permanent magnets about half as thick as each of said erasing magnets, and oppositely polarized with respect to their respective adjacent erasing magnets.

* * * * *